INVENTOR
Karl Schölzel
BY Spencer & Kaye
ATTORNEYS

INVENTOR
Karl Schölzel
BY Spencer & Kaye
ATTORNEYS

United States Patent Office 3,445,287
Patented May 20, 1969

3,445,287
PRODUCTION OF STORAGE BATTERIES
Karl Schölzel, Bad Soden, Taunus, Germany, assignor to Werner Greutert, Baden, Switzerland
Filed Apr. 8, 1966, Ser. No. 541,322
Claims priority, application Germany, Apr. 8, 1965, Sch 36,851; Sept. 3, 1965, Sch 37,673
Int. Cl. H01m 9/00, 11/00
U.S. Cl. 136—6
15 Claims

ABSTRACT OF THE DISCLOSURE

A method for preventing the creation of overpressures in a sealed storage battery when the battery is subjected to high charging currents, this being achieved by, before sealing the battery, concentrating the electrolyte solution by subjecting the battery to the desired high charging current level until gas no longer escapes from the battery, and then sealing the battery, whereby the interior of the battery will not be subjected to overpressures whenever the charging current does not exceed the desired level.

---

The present invention relates to a storage battery adapted to be operated continuously in a gas and liquid tight manner, as well as to a method for making and charging this gas and liquid tight storage battery and to an apparatus for carrying out this method.

Known gas tight batteries require a gas collecting chamber and/or a reserve chamber for a part of the electrolyte, in which, for example, hydrogen and/or oxygen forming during overcharging may recombine to form water and may react with the active electrode mass.

Quite apart from the structural expenditure connected with this construction, in these batteries, the negative electrode must have a higher capacitance than the positive electrode. Consequently, the capacitance of the negative electrode can not be fully used and owing to the manufacturing tolerances, the overpressures occurring in these batteries may differ within wide limits.

It is also known to provide the interior of gas tight batteries with adsorption substances for binding the formed gases. However, in the case of prolonged overcharging, their capacity of binding further quantities of gases becomes exhausted and uncontrollable overpressures can not be avoided even by these means. Thus, for reasons of safety, low charging currents are specified for gas tight batteries, or these are equipped with safety valves.

The value I of the charging current, measured in amperes [A] may be related to the charging capacity C of the battery, measured in ampere-hours [ah], by stating in hours [h] the time [t] required for the complete charging of a fully discharged battery with the current intensity I:

$$I[A] = \frac{C[ah]}{t[h]}$$

For known gas tight batteries, charging currents of the order of C/20 to C/6 are used. Even when the known precautions are taken, higher current intensities result during overcharging in uncontrollable and normally unknown internal overpressures which can endanger or destroy the battery.

There has also been described the charging of a conventional nickel-cadmium cell with a current intensity of C/2. However, during overcharging with this current intensity, the internal overpressure inside the battery exceeded a value of 185 p.s.i. Overpressures of this kind require very expensive housing constructions and gas tight closures.

The internal overpressure occurring during the overcharging is a function of the charging current intensity and the temperature of the cell. If these two values are constant, the overpressure is invariable for all constructions and sizes of cells.

With this in mind, it is the object of the present invention to provide a battery in which the pressure rise during overcharging is as low as possible, and moreover, in which this pressure rise is known as a function of the charging current intensity and temperature and may be adjusted.

Another object is to provide a battery which may be charged at very high current intensities in a very short time without giving rise to dangerous overpressures, even with overcharging for periods of any length.

These objects and others ancillary thereto are accomplished in accordance with preferred embodiments of the invention, wherein a gas tight and leak-proof battery is provided, preferably with an alkaline electrolyte and possibly with a separator between the electrodes. The electrolyte is evaporated to such an extent that the internal pressure occurring in the battery with overcharging for any period of time at a current intensity which may be freely selected as a function of the construction and application of the battery, does not exceed a freely selectable limit pressure, which has been conveniently present during its manufacture with regard to its intended application and in accordance with the construction of its housing.

A particularly interesting solution of this problem is achieved if the electrolyte has been evaporated only to such an extent that the internal pressure occurring in the overcharging of the battery with a maximum limit current intensity, which may be freely selected with regard to its construction and intended application, reaches at least substantially an upper limit pressure selected in accordance with the conditions of use and conveniently pre-set during the manufacture of the battery.

According to a further feature of the invention, a battery according to the invention is manufactured in such manner that the preferably alkaline electrolyte is evaporated in the substantially finished but not yet closed battery cell by the electrolytic decomposition of water and/or heating until such time as no further gases are developed at maximum electrical conductivity during overcharging at a current intensity selected in accordance with the intended application, and is then closed to form a gas tight container.

In this manner a gas tight closed battery is provided in which the overpressures occurring during overcharging are known as a function of the current strength and temperature and may be adjusted independently of these values in accordance with the intended application.

Additional objects and advantages of the present invention will become apparent upon consideration of the following description when taken in conjunction with the accompanying drawings in which.

Figure 1:
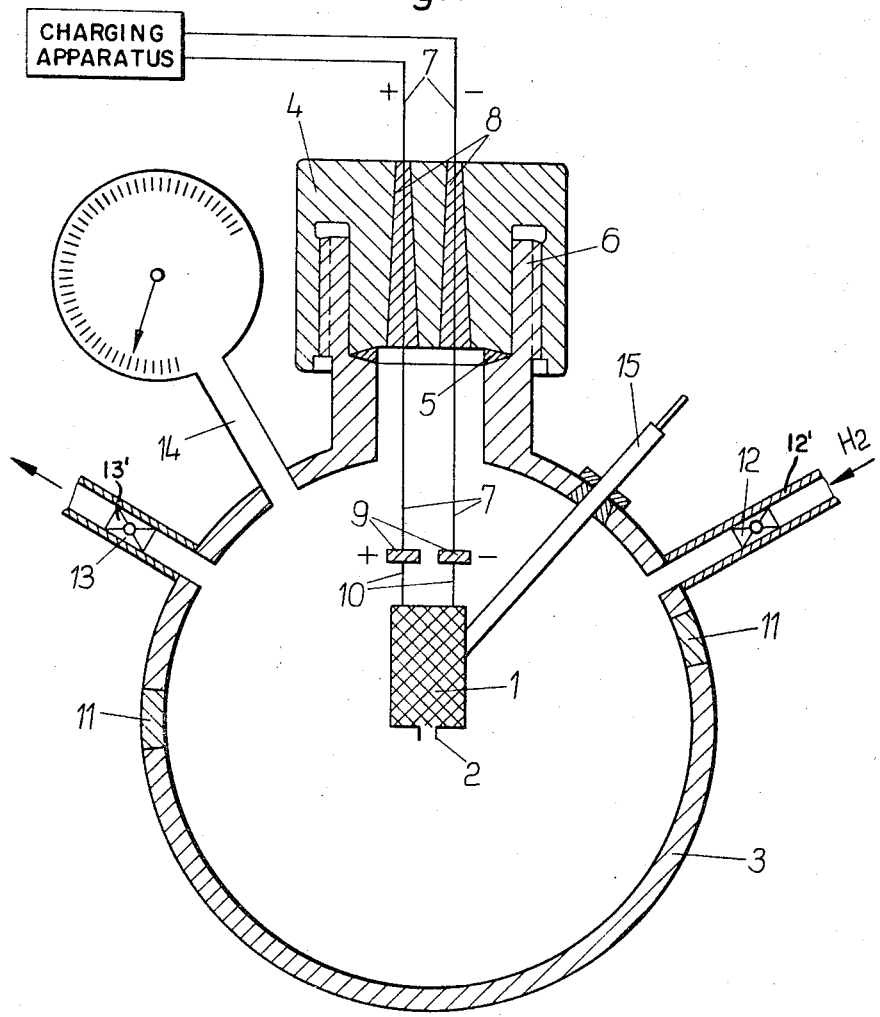
FIGURE 1 is a diagrammatic cross-sectional view of apparatus for charging a storage battery.

It should be noted that since the internal resistance of a battery with tightly packed electrodes, separated by an electrolyte-impregnated separator, changes comparatively little when the concentration of the electrolyte is raised, a conventional electrolyte of, e.g. 20–30% solution of caustic potash may be replaced by hydroxide solutions with substantially higher concentration, for example, a saturated hydroxide solution with solid phase.

This not only has the advantage that the amount of gas which can be generated by electrolysis during overcharging is reduced, owing to the lower water content, but in addition, the partial evaporation of the electrolyte produces numerous pores in a separator which offer a passage for the gas towards the opposite electrode, enabling the gas to react without restriction with the active mass of the electrodes. A special chamber for collecting these gases or for receiving any displaced electrolyte need no longer be provided.

Another advantage is that the oxygen forming during the overcharging of alkaline batteries may be fixed by the active mass of the negative electrode, for example, cadmium, zinc, iron or the like, especially if the electrode is not completely covered by the electrolyte. This is automatically the case where the electrolyte is evaporated according to the invention, because this evaporation entails the removal of solvent and thus a lowering of the liquid level, or a reduction of the liquid cover of the electrolyte separated by a separator.

Under the conditions mentioned hereinbefore, also the hydrogen possibly forming during the overcharging is oxidized at least substantially in equivalent amounts to form water so that no excessive internal overpressure arises, in spite of the continuous development of gas.

The battery according to the invention has therefore the further advantage that the gas pressure arising during overcharging at the predetermined maximum current intensity and known pursuant to the new mode of production, may be higher than the general safety limit permissible for a gas pressure of unknown magnitude.

Thus, the principle of the invention also relates to creating the conditions, both for the first charge of the gas tight battery during its assembly and for the subsequent recharging, whereby, owing to the suitable treatment of the elements participating in the generation of gases, and more particularly of the electrolyte, in conjunction with the other structural elements, such as electrodes and separator (where fitted) on the one hand, the generation of gas is low when the battery is operated conventionally, that is, with low charging currents. On the other hand a state of equilibrium may be established between the reaction partners in the gaseous-solid and gaseous-liquid phase boundaries, whereby with temporarily much higher charging currents, the forming excess gases are resorbed up to very high pressures immediately either chemically and/or physically, both in the solid and/or liquid phases.

During overcharging, especially at high current intensities, oxygen or hydrogen will first escape from new battery cells, the housings of which have not yet been tightly closed, according to whether the positive or negative electrode first reaches the state of full charge.

The invention has the further substantial advantage that both electrodes are charged equally and both can be fully utilized and that, when both electrodes have been fully charged, the cell during further overcharging will simultaneously develop oxygen and hydrogen. A part of both gases escapes through the still open hole in the housing, and the remainder reacts chemically inside the cell.

After a few minutes—or after a longer period in the case of larger quantities of electrolyte, lower concentrations of electrolyte and/or lower charging current intensities, the efflux of gases stops gradually and a state of equilibrium is reached, in which the amount of gas liberated by the overcharge electrolysis is equal to that fixed within the cell.

Under the catalytic effect for example of a sintered nickel frame, forming conveniently part of the electrodes, equivalent amounts of oxygen and hydrogen can recombine to form water. A substantial portion of the oxygen liberated in consequence of the overcharge electrolysis is fixed by the active mass of the negative electrodes, as known per se, for example by oxidizing cadmium metal to form cadmium hydroxide.

Moreover, according to the investigations on which the present invention is based, also a part of the hydrogen liberated by the overcharge electrolysis can be oxidized by the active mass of the positive electrode, for example, silver oxide, nickel (III) oxide, and the like, to form water, while an equivalent part of the active mass of the positive electrode is reduced to a lower valency or to metal.

When the state of equilibrium has been established, no further amounts of gas will escape. In some circumstances it will be useful after a further discharge of the battery to overcharge it at least once until the state of equilibrium has been established once more. The battery is closed in this state, and does not, after the gas tight closure has been made, develop any internal overpressure or a pressure remaining within certain limits, provided that during subsequent overcharging the predetermined maximum current intensity used for establishing the state of equilibrium, is not exceeded.

According to a further preferred feature of the invention the currents used for overcharging prior to closing the battery will be higher, for example, at least 2C. During this, the cell will heat up noticeably so that a portion of the solvent of the electrolyte, especially the electrolyte water, evaporates from the opening while a further portion is electrolytically decomposed. Also here, the state of equilibrium is established by virtue of a higher temperature.

If the tightly closed cell is subsequently overcharged at a current intensity which is smaller than, or equal to, the current intensity which has been used for establishing the equilibrium, even overcharging of long duration can not, under otherwise equal conditions, give rise to temperatures which are higher than that at which the state of equilibrium has been established. The internal pressure does not rise above the pre-set limit value. If the battery is to be used at higher ambient temperatures, e.g. in tropics, in outer space, or the like, it is recommended to select the temperature for establishing the equilibrium sufficiently high in accordance with the intended environment.

With higher charging current intensities, the state of equilibrium may also be produced almost exclusively by the electrolytic decomposition of the water, if the overcharging is effected isothermally, for example, in a thermostat at low temperature. This method is particularly advantageous where the tightly closed battery is to be later used in a cold environment. Furthermore, the equilibrium may also be established indirectly, merely by evaporating a part of the electrolyte solvent, and especially the water, by the external application of heat, for example, by heating the cell prior to its tight closure to a certain temperature, for example, to 50° C. During the adjustment of the equilibrium, the atmosphere surrounding the cell should preferably have a defined moisture content, which may be adjusted, as known in the art, as a function of the saturation vapor pressure of water at a given temperature. Under these conditions, the electrolyte maintains, during the adjustment of the equilibrium by virtue of its hygroscopic properties, a reproducible moisture content, and this may be particularly desirable where large series are manufactured. The complete drying out of the cell should be avoided, because in this case its internal resistance will become too large.

If the method of adjusting the equilibrium by means of externally applied heat is adopted, the maximum current intensities, at which no internal pressures occur when the closed cells are overcharged, may be plotted in calibrating curves as a function of the temperature and water vapor pressure of the environment, for all constructions and sizes of battery cells.

The state of equilibrium is affected, in addition to the temperature, the ambient water vapor pressure and the ambient gas pressure, also by the partial pressure of the hydrogen and oxygen occurring during the electrolytic decomposition in the cell.

With more particular reference to the drawings, FIGURE 1 shows a battery 1 having a housing which has an orifice 2. The battery is introduced into a pressure chamber 3, the neck of which may be tightly closed by means of a plug 4 with a pressure thread 6 and a ring seal 5. In this embodiment, the pressure chamber is made of metal, and more particularly of steel, in order to produce higher pressures. The current leads 7 are insulated from the metal plug 4 by conical sleeves 8 of electrically insulating materials, such as ceramics or plastics. The terminal pins 10 of the battery may be connected through terminals 9 and leads 7 to an external charging circuit.

The interior of the vessel may be observed through two windows 11 of thick glass or transparent plastic material. The chamber may be supplied from an external source with gas, for example with hydrogen, through a conduit 12' adapted to be closed by a valve 12. Through an adjustable pressure relief or overpressure valve 13, gas may escape through conduit 13' during the scavenging of the vessel or in consequence of an internal overpressure. This valve also serves for fixing the variable upper pressure limit for adjusting the equilibrium in the cell 1. Pressure and temperature within the chamber 3 may be measured by means of a pressure gauge 14 and a thermoelectric element 15.

When the equilibrium is to be adjusted at normal pressure or at a pressure differing only slightly from the normal pressure, the metal vessel 3 may also be replaced by a glass flask. In this case, the plug, which may also be of glass and may have the current leads 7 embedded therein, and the measuring apparatus may be connected with the vessel by being smoothly ground so as to fit into the flask and form a fluid-tight connection.

Preferably, the equilibrium will be established at normal barometric pressure. To this end, the vessel 3, into which the open cell 1 has been placed, can be scavenged with hydrogen until the air has been removed therefrom. The valve 13 will be so set that it opens automatically when the ambient air pressure is slightly exceeded and closes again after the scavenging has been completed.

During the subsequent overcharging of the cell at a given current intensity, oxygen and/or hydrogen will escape from the opening 2 into the gas chamber of the vessel 3. The resulting overpressure is equalized by the automatic opening of the valve 13. When the valve 13 subsequently closes, the cell 1 is in the state of equilibrium hereinbefore described. After switching off the charging current, the cell 1 may be removed from the vessel 3 and may be tightly closed.

The charge of the vessel 3 results in a comparatively high partial hydrogen pressure during the establishment of the equilibrium condition and thus in a higher residual moisture content of the electrolyte.

The establishment of a defined partial water vapor pressure in the vessel 3 has the object of preventing, during the establishment of the equilibrium condition in the cell 1, larger quantities of water vapor from diffusing through the opening 2 into the gas chamber of the vessel 3, which would cause the electrolyte to lose residual moisture in undesirable quantities. By introducing a small amount of water in the liquid phase into the vessel 3, the saturation vapor pressure, dependent only on the temperature, will appear therein. Lower values may be obtained, for example, by saturating the flow of gas required for the scavenging with water vapor at a given temperature, which must be lower than that in the vessel 3. For example, when the flow of hydrogen is passed through a washing bottle filled with water or with an aqueous solution, the temperature of which is held constant at 25° C., a partial water vapor pressure of about 23 mm./Hg will arise in the vessel 3, if the temperature in the vessel 3 exceeds 25° C.

By expressing this equilibrium for the gas reaction between hydrogen and oxygen, in terms of the law of mass action $$K = \frac{[H_2][O_2]^{1/2}}{[H_2O]}$$

in which K is the reaction constant of the formation reaction, it may be seen that a high partial hydrogen pressure supports the formation of water and thus also the maintenance of a higher residual moisture in the electrolyte.

The heterogenous reaction between hydrogen and the active substance of the positive electrode is subject to an equivalent condition. The admixture of an inert gas would lead to the same state of equilibrium only at a correspondingly higher total pressure. For this reason it is convenient to keep the partial pressure of such gases, for example, nitrogen, as low as possible.

The vessel 3 may also be filled, before and/or during the overcharging, with oxygen, the partial pressure of which also has a favorable effect on the equilibrium condition. However, a substantial portion of the oxygen reacts in a heterogenous reaction with the active substance of the negative electrode to form hydroxide, whereby a part of the negative electrode substance is discharged without reforming the water necessary to maintain the electrical conductivity.

If the vessel 3 surrounding the cell 1 contains air, another state of equilibrium occurs under otherwise identical external conditions. Owing to the lower hydrogen partial pressure, which builds up in this instance only in consequence of the generation of gas during the overcharging, and owing also to the high partial pressure of nitrogen, which does not participate in the chemical reactions in the cell, this equilibrium condition is less favorable, because it leads to a lower residual moisture content of the electrolyte. However, where a minimum internal electrical resistance is not of primary importance, this method has the advantage of simplicity and economy, especially because a pressure chamber of the type shown in FIGURE 1 may be omitted.

In principle, the opening 2 in the housing of the cell will be as narrow as possible in order to prevent substantially the re-diffusion of oxygen and/or nitrogen into the cell during the establishment of the equilibrium condition, and especially during the dropping off of the flow of gas from the cell. Where the gas surrounding the cell is air, the vessel 3 may even be omitted.

After equilibrium condition has been established, the charging current is switched off, the cell 1 is removed from the vessel 3 (if it had been mounted therein) and is tightly closed, for example, by screwing in a seal, closing the openings by gluing or welding, or—possibly also additionally—by sealing with a casting compound, such as araldite.

Cells manufactured according to the methods hereinbefore described are not subject to internal overpressures when used according to instructions.

However, the equilibrium may also be established at higher pressures of the surrounding gaseous phase in the vessel 3, if the construction of the cell housing permits the occurrence of limited internal overpressures. The advantage of this method lies in maintaining a higher residual moisture in the electrolyte than would be possible at normal pressure. The cells can be closed in the pressure apparatus used for establishing the equilibrium.

However, in most cases it is sufficient to terminate, at small technical expense, the overcharging or the supply of heat after the equilibrium has been established and to effect the pressure equalization with the ambient air, whereupon the battery is sealed, possibly with simultaneous cooling.

The appearing internal overpressures may be determined by means of calibrating curves as a function of the intensities of the charging current and other operating conditions, for example, the temperature, the size of the cell, and the like.

The equilibrium may also be established at lower pressures than 760 mm./Hg, and the gases liberated during the overcharging electrolysis can be drawn off through the valve 13. Although this method will reduce the residual moisture of the electrolyte to a higher degree, this solution will substantially simplify the gas-tight closure of cells, intended to be operated in a vacuum, such as in outer space.

The establishment of equilibrium may also be combined with the forming of the electrodes, as known in the art. The period during which the equilibrium is established under a given set of conditions depends, in addition to the conditions of the variables which characterize the equilibrium, also on the amount of water to be removed from the electrolytic phase, and on the size of the aperture through which the gases can escape from the cell.

The economically desirable quick establishment of the equilibrium may be achieved, for example, by supplying only a small excess of highly concentrated electrolyte solution. The use of an excess of liquid electrolyte solvent during the manufacture is desirable, in order to produce the complete wetting of the electrodes which usually have a very large internal surface.

In principle, it is also possible to allow the electrodes and separators, wetted with the electrolyte solution, to dry before their installation in the housing. If the wetting has the object of facilitating the penetration of the aqueous solution into the porous frame of the electrodes in a vacuum in a vacuum apparatus, the partial drying of the electrodes and separators may also be carried out subsequently in such an installation.

Although batteries manufactured in this manner have the drawback that their internal overpresures can only be estimated empirically, they offer the substantial advantage of a much more economical manufacture.

The moisture of the electrolyte remaining in the state of equilibrium is a function of the surface and capacitance ratios between the positive and negative electrodes, having special regard to the electrolytic decomposition. As already mentioned, the invention has the great advantage that the surfaces and capacitances of both electrodes may have the same values. In this case, the cell has, at a given weight and volume, its maximum capacitance, whilst in all other cases, the capacitance of the cell can not exceed the individual capacitance of the smaller electrode.

Figure 2:
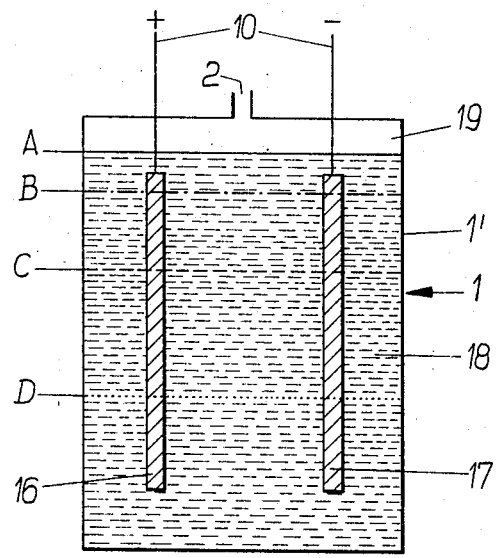
FIGURE 2 is a diagrammatic cross-sectional view of a first embodiment of a storage battery.

FIGURE 2 shows an embodiment of a battery according to the invention without a separator, and shows how the residual moisture of the electrolyte may be adjusted at an optimum value at which the internal resistance of the battery cell is as low as possible.

FIGURE 2 shows diagrammatically the relation between the internal resistance of a battery and the gas pressure occurring during overcharging at a given current intensity, as a function of the amount of electrolyte present and of the electrode surface not affected by the electrolyte.

The top of the housing 1' has an aperture 2, which may be tightly closed. A disc-like positive electrode 16 is mounted opposite a similar negative electrode 17. The current leads 10 pass through the upper wall of the housing 1' in a fluid-tight manner.

When the electrodes 16 and 17 are completely flooded by the electrolyte 18, as shown, for example, by the level A in FIGURE 2, the internal resistance of the battery is at its minimum. The gases generated during the overcharging of the battery on the electrodes 16 and 17, that is to say, oxygen and/or hydrogen, rise in the form of small bubbles in the liquid electrolyte and accumulate in a space 19 of the housing 1' above the level of the electrolyte in which space they can not come into direct contact with the electrodes. Only a small part of these gases, which is dissolved in the electrolyte, can react with the active substance of the electrodes.

If the opening 2 were closed during the overcharging, the resulting internal gas pressure could reach values which might cause the battery 1 to explode.

The level B for the electrolyte is somewhat lower so that the electrodes 16 and 17 are not fully submerged in the electrolyte. The small, exposed surface of the negative electrode 17, projecting above the electrolyte level B, can then react with the oxygen liberated during the overcharging from the positive electrode 16 and accumulating in the chamber 19, while an equivalent portion of the mass of the negative electrode is oxidized under absorption of this gas.

Similarly, the corresponding small, exposed surface of the positive electrode 16, which also projects above the electrolyte level B, can react with the hydrogen, liberated during the overcharging from the negative electrode 17 and accumulating in the chamber 19, while again an equivalent portion of the active mass of the positive electrode is reduced under absorption of this gas. A further portion of the hydrogen can finally react under the catalytic action of the electrode substances with the oxygen to form water.

The internal resistance of the battery is somewhat larger for the level B than for the level A. While, with the electrolyte at level A, the battery may be overcharged in principle only with the housing open, with the electrolyte at level B, the opening 2 may be closed, but overcharging without danger is possible only at comparatively low values of current.

The conditions described above with reference to the level B of the electrolyte apply with substantial simplification to the hitherto known gas-tight battery. If the gas pressure occurring in the closed housing with the electrolyte at level B reaches, for example, 14.7 p.s.i., during overcharging at a current of, say, 0.1 C, the pressures generated during overcharging at higher values of current would reach values which could endanger the battery.

Overcharging at higher values of current is possible only by lowering the level of the electrolyte below the level B so that a larger exposed surface of the electrodes is available for the absorption of the gases which develop in larger quantities. On the other hand, it is desirable not to lower the level of the electrolyte more than absolutely necessary so as not to increase the internal resistance of the battery excessively.

According to the principle of the invention, this optimum level C occurs automatically when the battery is overcharged with aperture 2 open at a pre-selected current and at a preselected gas pressure, due to the electrolytic decomposition of the surplus water, starting for example from a level B of the electrolyte. The position of this level C may be affected by the choice of the variables in the environment of the battery. These conditions have already been described in connection with FIGURE 1.

When the level C has been reached, the opening 2 can be closed and the battery can be overcharged without risk under the specified conditions.

If the level of the electrolyte is lowered to a lower level D, for example by evaporating water through the opening 2, overcharging under otherwise identical conditions will result in an even lower gas pressure than with level C, but the internal resistance of the battery reaches an unnecessarily high value.

Thus, the establishment of the optimum level C of the electrolyte makes it possible to overcharge the battery at a pre-selected high current and at a gas pressure, defined as a function of this current, while the internal resistance remains as low as possible.

Figure 3:
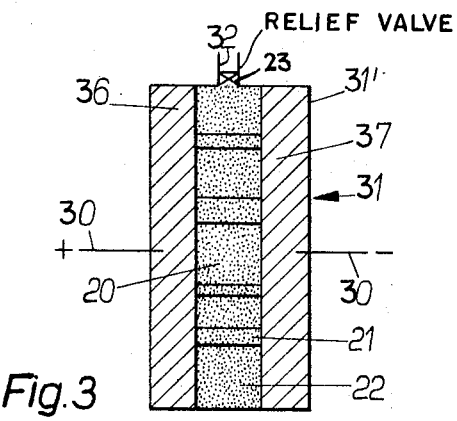
FIGURE 3 is a diagrammatic cross-sectional view of a second embodiment of a storage battery.

FIGURE 3 shows diagrammatically the same conditions, applied to a battery of more convenient construction, in which the electrodes 36 and 37 together with a porous, electrolyte-impregnated separator 20, fill the whole housing. During the overcharging of this battery at which time valve 23 is not in place, oxygen and/or hydrogen escape through the orifice 32, while small channels 21 form within the separator 20 through which gases can flow from one electrode to the other. The ratio between these gas channels 21 and the remaining electrolyte bridges 22 is variable, as described in conjunction with FIGURE 2, and permits an optimum value to be obtained.

A battery such as that shown in FIGURE 3 may have a valve 23 disposed in the orifice 32. Such a battery is not sensitive to a temporary surpassing of its maximum charging current since the valve 23 is an adjustable automatic pressure relief valve which opens when the predetermined maximum charging current is exceeded and closes again when a predetermined balancing pressure has been reached.

Figure 4:
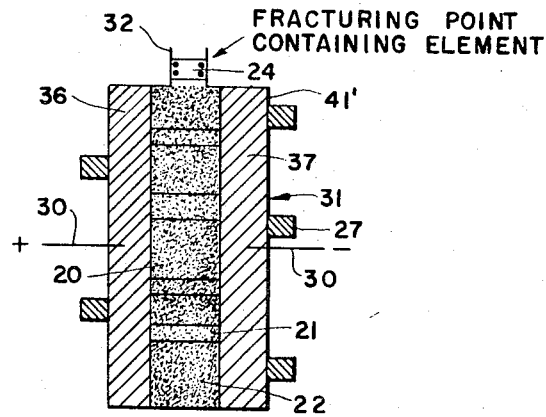
FIGURE 4 is a diagrammatic view similar to FIGURE 3 but showing a modification thereof.

A similar battery is shown in FIGURE 4. This one differs from the battery shown in FIGURE 3 in having a safety device 24 which provides a preselected fracturing point in the event there is an accidental surpassing of the specified maximum charging current intensity. This fracturing point may be provided in safety device 24 in the form of an exchangeable screw-in or plug-in member which is pressure responsive.

Figure 5:
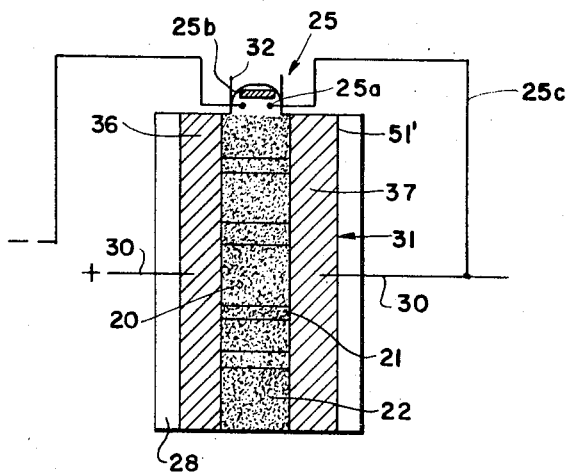
FIGURE 5 is a view similar to FIGURE 4 but showing a still further modification.

A slighlty modified construction is shown in FIGURE 5 wherein a pressure-responsive charging current breaker 25 is provided in orifice 32 for preventing the maximum charging current from being exceeded. This includes a member 25a mounted on elastic diaphragm 25b so that the electrical contact located in charging circuit line 25c may be broken in response to internal overpressure being created when the specified maximum charging current is exceeded.

For assuring that there is comparatively little inherent heating even during overcharging at high currents, the housings 41′ and 51′ of FIGURES 4 and 5, respectively, are constructed to have good thermal conducting properties and may be partially made of metal. Also in order to be better capable of removing heat generated within the housing particularly during overcharging at high currents, heat dissipating elements may be used. In FIGURE 4 they are in the form of cooling spirals 27 while in FIGURE 5 they are cooling ribs 28.

According to a further development of the principle of the invention, it is also possible to introduce the electrolyte solution under external conditions which are at least substantially comparable to those obtained with established equilibrium, in order to produce a preselected pressure, namely in such concentration and amount as corresponds to the final state of evaporation.

A battery which is intended for use with external pressures between 0 and 14.7 p.s.i. is constructed so that the electrolyte level is such that the internal battery pressure which occurs during overcharge at the preselected current is less than 14.7 p.s.i. and substantially corresponds to the pressure of the external atmosphere. A battery for use at about normal atmospheric pressure would be arranged so that the internal battery pressure during overcharge would be about 14.7 p.s.i.

A non-pressure sensitive battery with a low internal resistance may have a housing which is strong enough to withstand a pressure $x$. The battery is produced so that the internal battery pressure during overcharge would be larger than 14.7 p.s.i. and less than $x$.

Batteries in accordance with the present invention may be constructed with frames for the electrodes. Such frames may contain pressed powdered nickel and/or finely granulated sintered metals, such as nickel, cobalt and/or silver which catalytically accelerate the chemical reaction resulting in the consumption of the gases which form continuously during the overcharging of the battery.

The battery according to the present invention may be constructed to have the individual capacitance of its positive electrode or electrodes substantially equal to or smaller than the individual capacitance of its negative electrode or electrodes. When the capacitances are equal the battery has a comparatively high capacitance per unit of volume or weight and when that of the positive electrode is smaller there is a comparatively large amount of liquid electrolyte so that there is a low internal resistance.

In one embodiment two battery cells may be connected to form part of a battery and in order to prevent excessive internal pressures occurring with a reversal of the terminals when there is an excessive discharge, the individual capacitance of its positive electrode or electrodes is larger than the individual capacitance of its negative electrode or electrodes.

A further simplification and even more economical manufacture may be achieved for batteries which may have a higher internal resistance and need not meet excessively high requirements regarding their operational reliability, in that the electrodes and separators are impregnated with the electrolyte, possibly in large webs which are subsequently cut to the required dimensions. They are dried prior to their installation in the housing to such an extent that, after the manufacture and after the at least substantial gas-tight closure of the batteries manufactured in this manner, the internal pressure occurring during overcharging at the specified charging current remains below a predetermined limit value.

Another particularly economical embodiment of the method according to the invention, for manufacturing a battery with a high degree of operational reliability and accurately defined properties includes partially drying the electrodes and separators, after their impregnation with the electrolyte solution, so that the subsequent further evaporation of the electrolyte can be effected within a short period in the open housing of the finished battery, in order to produce a required property, followed by the at least substantially gas-tight closure of the battery cell.

According to yet another embodiment of the method according to the invention, the electrodes and separators are impregnated with the electrolyte solution under a vacuum in a vacuum device, in order to improve the wetting of their large internal surfaces. The subsequent partial drying out of the electrolyte solution on the wetted electrodes and separators may then conveniently be effected in the same apparatus.

The present invention makes it possible to operate with charging currents of the order of C/6 and more, without incurring the risk of undesirably high or dangerous overpressures. Moreover, substantially higher charging currents of, for example, 6 C may be used, resulting in the advantage of extremely short charging times of less than six hours, and possibly of as little as about ten minutes. Charging currents may, for example, be up to about 10 C.

The storage battery can also be charged with pulse-like D.C. to safely overcharge it, in which case the pulse amplitudes or peaks can be about or more than 300 C with an average value of about 6 C. A pulse frequency of, for example 50 c.p.s. has been found to be suitable.

While the above explanations are directed, essentially, to batteries having alkaline electrolytes, it is possible, in accordance with a further feature of the present invention, to use batteries with acidic electrolytes such as those that have at least some sulphuric acid. According to a particular embodiment, the battery is constructed in accordance with the principle of the per se known lead storage battery having, as electrolyte, sulphuric acid.

In the charged state the active mass of the negative electrode is lead and the active mass of the positive electrode is at least in part lead dioxide.

It will be understood that the above description of the present invention is susceptible to various modifications, changes, and adaptations, and the same are intended to be comprehended within the meaning and range of equivalents of the appended claims.

What is claimed is:

1. In the production of a gas and liquid tight storage battery having, in a housing having at least one opening, a positive electrode, a negative electrode and a mass of electrolyte solution between the electrodes, the improvement comprising:

maintaining the opening of the housing in an open state for placing the electrolyte solution in communication with the region surrounding the housing; overcharging the battery with a charging current of at least C/6 amperes, where C is the charging capacity of the battery in ampere-hours, for concentrating the electrolyte, said overcharging continuing until gas no longer escapes from the housing; and closing the housing opening for sealing the housing in a gas and liquid tight manner.

2. A method as defined in claim 1 wherein an alkaline electrolyte is used.

3. A method as defined in claim 1 wherein an acid electrolyte is used.

4. A method as defined in claim 1 wherein the electrolyte is concentrated by overcharging the battery while applying heat to the electrolyte.

5. A method as defined in claim 1 wherein said step of overcharging is carried out while the battery is in a pressure chamber filled with hydrogen having a high moisture content.

6. A method as defined in claim 1 wherein said step of overcharging is carried out by overcharging the battery with a pulsating charge current.

7. A method as defined in claim 6 wherein the pulsating charge current presents current pulse peaks of greater than 300 C amperes and an average value of about 6 C amperes.

8. A method as defined in claim 1 wherein said step of overcharging is carried out while the battery is in a pressure chamber in which are created controlled pressure, temperature and moisture conditions.

9. A method as defined in claim 1 comprising the further step of, during said overcharging step, maintaining the region surrounding the housing at a pressure which is related to the required internal battery resistance in such a way that with decreasing pressure the electrolyte concentration, and hence the internal battery resistance, increases.

10. In a gas and liquid tight sealed rechargable storage battery including a fluid tight housing in which are disposed a positive electrode, a negative electrode, and a mass of electrolyte between said electrodes, which battery has a given charging capacity of C ampere-hours, the improvement wherein said electrolyte has been concentrated, before the housing was sealed, by overcharging said battery with a charging current of at least C/6 amperes until gas no longer escapes from said housing.

11. An arrangement as defined in claim 10 wherein the external pressure existing during the overcharging has a value such that the maximum pressure developed within said battery during such overcharging for an indeterminate period of time does not exceed about 1 atmosphere.

12. An arrangement as defined in claim 10 wherein the charging capacity of said positive electrode is lower than that of said negative electrode.

13. An arrangement as defined in claim 10 wherein the charging capacity of said positive electrode is greater than that of said negative electrode.

14. An arrangement as defined in claim 10 wherein the active mass of said negative electrode, in its charged state, includes lead, the active mass of said positive electrode, in its charged state, includes lead dioxide, and the electrolyte is composed at least in part of sulfuric acid.

15. An arrangement as defined in claim 10 further comprising an adjustable automatic pressure relief valve disposed in said housing and arranged to open at the pressure produced in said housing when the predetermined maximum charging current is exceeded and to close when a predetermined balancing pressure has been reached.

References Cited

UNITED STATES PATENTS

| | | | |
|---|---|---|---|
| 3,057,942 | 10/1962 | Smith et al. | 136—6 |
| 3,057,943 | 10/1962 | Strauss | 136—6 |
| 3,081,366 | 3/1963 | Belove | 136—6 |
| 3,258,360 | 6/1966 | Kordesch | 136—6 |
| 3,293,081 | 12/1966 | Daley | 136—178 |

WINSTON A. DOUGLAS, *Primary Examiner.*

DONALD L. WALTON, *Assistant Examiner.*

U.S. Cl. X.R.

136—161